Nov. 13, 1951 H. CARTER 2,574,858
BORDER CLIPPING DEVICE
Filed Jan. 27, 1947 2 SHEETS—SHEET 1
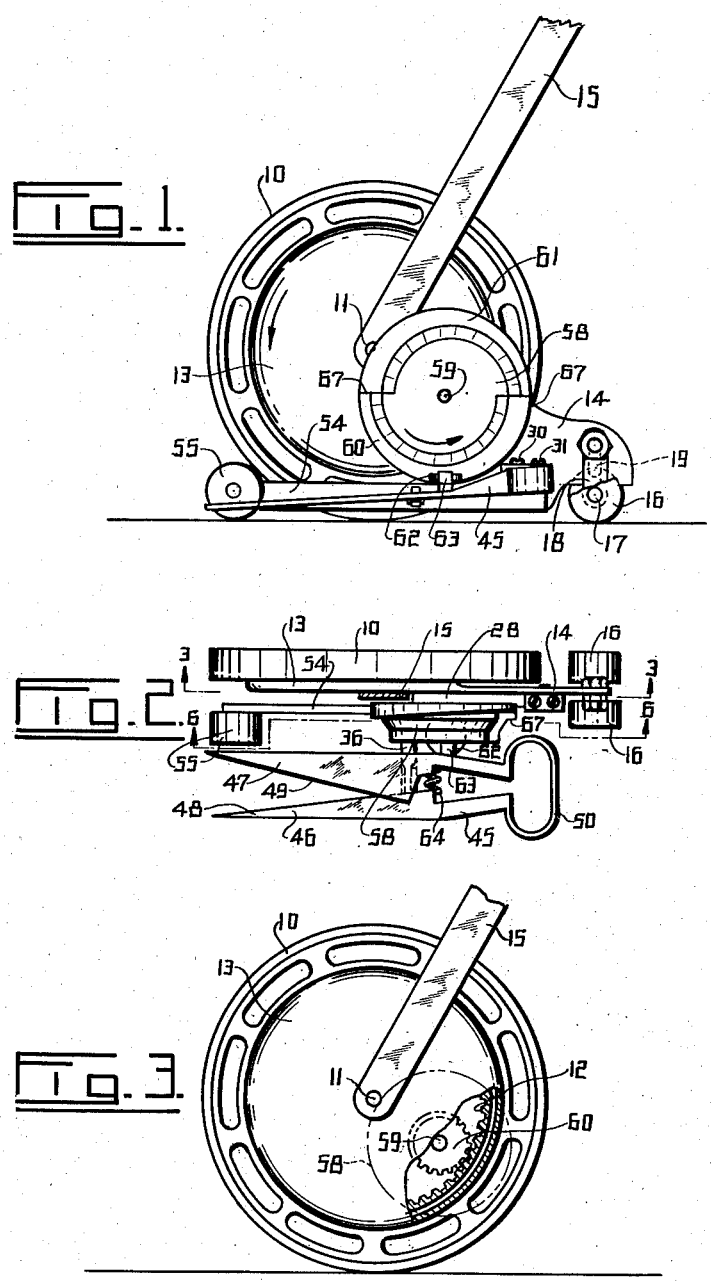
INVENTOR
HENRY CARTER
BY
Fetherstonhaugh & Co.
ATTORNEYS Nov. 13, 1951     H. CARTER     2,574,858
BORDER CLIPPING DEVICE
Filed Jan. 27, 1947     2 SHEETS—SHEET 2
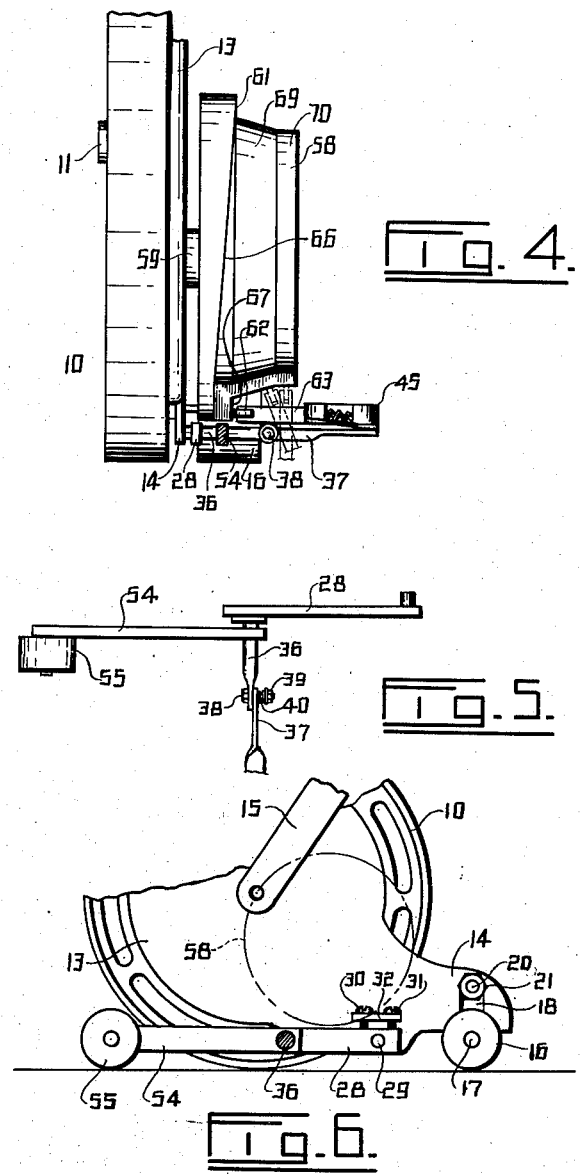
INVENTOR
HENRY CARTER
BY
Fetherstonhaugh & Co.
ATTORNEYS Patented Nov. 13, 1951

2,574,858

UNITED STATES PATENT OFFICE 2,574,858

BORDER CLIPPING DEVICE

Henry Carter, Victoria, British Columbia, Canada

Application January 27, 1947, Serial No. 724,681

3 Claims. (Cl. 56—241)

1

This invention relates to an improved border clipping device.

An object of the present invention is the provision of a device for clipping the edges of lawns, around flower beds, and doing other fine clipping jobs.

Another object is the provision of a clipping device which follows the contour of the ground and which may be regulated to clip at different heights.

A further object is the provision of a clipping device which may be adjusted to cut vertically or at an angle to the horizontal even when the device is operating on a horizontal surface.

Numerous devices have been brought out for clipping the edges of lawns, but they have not been very successful. Most of them seem to fail to cut the grass evenly, or they have difficulty in operating over ground that is not absolutely smooth. At present, the edges of most lawns are still trimmed by hand clippers despite the fact that it is a slow, tedious and back-breaking job. This device makes this type of work no longer necessary as it clips the grass at a constant height above the ground, it follows the contour of the ground, and the user merely pushes it as he would a lawn mower.

With the above and other objects in view, the present invention consists essentially of a border clipping device comprising a frame, means for carrying said frame, a pair of clippers supported by the frame, and means for operating the clippers, as more fully described in the following specification and illustrated in the accompanying drawings, in which Figure 1 is a side elevation of the device, Figure 2 is a plan view thereof, Figure 3 is a section taken substantially on line 3—3 of Figure 2 with part of the frame broken away, Figure 4 is an enlarged front elevation of the device with part thereof removed, Figure 5 is a plan view of a detail of the device, and Figure 6 is a section taken substantially on the line 6—6 of Figure 2.

Referring more particularly to the drawings, 10 is a vertical wheel having an axle 11 and an internal gear 12, see Figure 3. A frame 13 is freely carried by the axle 11 and fits inside the wheel, said frame having an arm or extension 14 projecting rearwardly therefrom past the periphery of the wheel. A handle 15 is pivotally mounted in the axle and extends upwardly therefrom. Rollers 16 are attached to the extension

2

14 and are preferably adjustable in relation thereto. If there are two wheels, as shown, these may be mounted on an axle 17 having an arm 18 extending upwardly therefrom. The extension has an elongated vertical slot 19 therein, and a bolt 20 extends through said slot and a hole in the arm 18, while a nut 21 is threaded on the bolt to tighten the arm and extension together. With this arrangement, the extension 14 may be raised or lowered in relation to the ground as the frame 13 moves around the axle 11. The roller or rollers 16 stabilize the wheel 10 and maintain it in a vertical plane.

A substantially horizontal supporting member 28 is pivotally mounted at one end on the extension 14 by means of a pin 29. This member is adjustably retained in its position by set screws 30 and 31, see Figure 6, which are threaded through a shoulder 32 projecting outwardly from the extension, said screws bearing on the member, one on each side of the pivot pin.

A shaft 36 is rotatably mounted in the opposite end of the member 28 and projects outwardly therefrom in a substantially horizontal plane. This shaft preferably includes an extension 37 pivotally connected thereto by a bolt 38 having a nut 39 screwed thereon, see Figure 5. The corresponding ends of the shaft and this extension are flattened in a vertical plane for this purpose, and the adjacent surfaces thereof may be formed with co-operating grooves and ribs, not shown, in which case a spring 40 is provided on the bolt 38 inside its nut 39. The extension 37 is flattened horizontally at the outer end thereof and clippers 45 are fixedly mounted thereon. These clippers are of the type having two long pointed and overlapping blades 46 and 47 which co-operate with each other and have the respective cutting edges 48 and 49. These blades are joined by a looped spring 50 which resiliently retains them in their normal open positions, that is, with the points thereof separated. The shaft 36 or its extension 37 is secured to the outer blade 46 near the inner end of its cutting edge, while the inner blade 47 is free to move in relation to said outer blade. When the nut 39 is tightened, the shaft 36 and the extension 37 form a supporting member for the clippers.

An arm 54 is fixed at its inner end to the shaft 36 and has a roller 55 at its outer end, said roller being positioned beside the tips of the blades of the clippers 45. Actually, this roller keeps the blade tips a predetermined distance above the ground because the arm 54 is fixed to the shaft 36 and the latter, on which the clippers are mounted, is rotatable in the supporting member 28.

Suitable means is provided for operating the clippers 45, that is, for reciprocating the blade 47 in relation to the blade 46. A cam wheel 58 is mounted on a shaft 59 which is carried by and extends through the frame 13 and has a pinion 60, see Figure 3, on its inner end meshing with the internal gear 12 of the wheel 10. The wheel 58 has a cam surface 61 lying in a substantially vertical plane. A roller 62, mounted on the inner end of a link 63, is adapted to ride on this cam surface. The outer end of the link 63 is connected to the arm 47 of the clippers, and, therefore, the spring 50 resiliently presses the roller 62 against the cam surface. If desired, an additional spring 64 extending between the arms 46 and 47, may be provided to assist the spring 50 in this purpose.

The cam surface 61 of the wheel 58 consists of one or more ramps 66, each of which slopes up to a shoulder 67, see Figure 4. As the cam wheel is rotated, the roller 62 moves up each ramp 66 to a shoulder 67 and then drops down on to the bottom of the next ramp. This moves the roller back and forth horizontally so that the arm 47 is reciprocated in relation to the arm 46.

If the shaft 36 is a solid member out to the clippers, the one cam surface 61 on the cam wheel is sufficient. If, however, the shaft is formed in two pieces, it is desirable to provide the cam wheel with a cam surface 69 at an angle to the surface 61 and with another cam surface 70 lying in a horizontal plane. These latter cam surfaces are formed in the same manner as the surface 61, that is, they include one or more ramps, each of which slopes up to a shoulder. With this arrangement, the clippers may be moved into a position at an angle to the horizontal or into a vertical plane and the roller 62 will bear against the cam surface 69 or 70, as indicated in broken lines in Figure 4. Thus, the cam wheel 58 operates the clippers regardless of the position thereof.

This device is pushed along the ground by means of the handle 15. As the wheel 10 is rotated, the cam wheel 58 revolves and the clippers are operated. The open blades 46 and 47 gather in the grass as they are moved along, and the reciprocating latter blade into it. If there is a rise in the ground, the roller 55 rides over it and lifts the tips of the blades so that they do not stick into the ground. The height above the ground at which the clippers operate, is regulated by raising or lowering the extension 14 of the frame 13 in relation to the rollers 16. This raises or lowers the supporting member 28, shaft 36 and the clippers. Fine vertical adjustment of the clippers may be obtained by means of the set screws 30 and 31. The clippers may be set to cut at an angle or in a vertical plane while the rest of the device rides on a horizontal plane.

What I claim as my invention is:

1. A border clipping device comprising a vertical wheel, a frame carried by the wheel, a pair of clippers supported by the frame, said clippers having blades normally lying substantially parallel to the ground, means for adjusting the clippers angularly and laterally in relation to the ground, a wheel having a plurality of cam surfaces rotated by the vertical wheel, said cam surfaces being for different angular settings of the clippers, an arm connected to one of the clipper blades, a roller on the opposite end of the arm adapted to ride on the cam surfaces, and spring means resiliently urging said roller against any of the cam surfaces, said surface depending upon the angular setting of the clippers.

2. A border clipping device comprising a vertical wheel, a frame carried by and lying parallel with the wheel, a shaft supported by the frame and projecting laterally therefrom, an extension pivotally connected to the shaft, said extension being movable in a vertical plane, means for retaining the extension in any adjusted position in relation to the shaft, a pair of clippers mounted on the outer end of the extension substantially at right angles thereto, said clippers having blades normally lying substantially parallel to the ground, a wheel having a plurality of cam surfaces rotated by the vertical wheel, an arm connected to one of the clipper blades, a roller on the opposite end of the arm adapted to ride on the cam surfaces, and spring means resiliently urging said roller against any of the cam surfaces, said surface depending upon the angular setting of the extension and clippers.

3. A border clipping device comprising a vertical wheel, a frame carried by and lying parallel with the wheel, a shaft rotatably supported by the frame and projecting laterally therefrom, an extension pivotally connected to the shaft, said extension being movable in a vertical plane, means for retaining the extension in any adjusted position in relation to the shaft, a pair of clippers mounted on the outer end of the extension substantially at right angles thereto, said clippers having blades normally lying substantially parallel with the ground, an arm fixed to the shaft and extending forwardly therefrom, a roller on the outer end of the shaft adjacent the forward ends of the clipper blades, a wheel having a plurality of cam surfaces rotated by the vertical wheel, an arm connected to one of the clipper blades, a roller on the opposite end of the arm adapted to ride on the cam surfaces, and spring means resiliently urging said roller against any of the cam surfaces, said surface depending upon the angular setting of the extension and clippers.

HENRY CARTER.

REFERENCES CITED

The following references are of record in the file of this patent:

UNITED STATES PATENTS

| Number | Name | Date |
| --- | --- | --- |
| 571,160 | Hasse | Nov. 10, 1896 |
| 666,111 | Rauber et al. | Jan. 15, 1901 |
| 681,815 | Shepler | Sept. 3, 1901 |
| 819,176 | Secrest | May 1, 1906 |
| 1,218,173 | Erickson | Mar. 6, 1917 |
| 1,279,052 | Welch | Sept. 17, 1918 |
| 1,428,284 | Heimann | Sept. 5, 1922 |
| 1,445,515 | Jones et al. | Feb. 13, 1923 |
| 1,860,317 | Clark | May 24, 1932 |
| 2,521,293 | Hunt et al. | Sept. 5, 1950 |

FOREIGN PATENTS

| Number | Country | Date |
| --- | --- | --- |
| 343,175 | Great Britain | Feb. 19, 1831 |